(12) United States Patent
Branly

(10) Patent No.: US 8,406,260 B2
(45) Date of Patent: Mar. 26, 2013

(54) ANTI-TRANSVERSE LASING DEVICE WITH LONGITUDINAL COOLING FOR EMITTING A LASER BEAM

(75) Inventor: Stéphane Branly, Brieres-les-Scelles (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/328,891

(22) Filed: Dec. 16, 2011

(65) Prior Publication Data

US 2012/0320937 A1 Dec. 20, 2012

(30) Foreign Application Priority Data

Dec. 17, 2010 (FR) ...................................... 10 04945

(51) Int. Cl.
*H01S 3/04* (2006.01)
(52) U.S. Cl. ................. 372/35; 372/34; 372/41; 372/70
(58) Field of Classification Search .................... 372/35, 372/34, 41, 70
See application file for complete search history.

(56) References Cited

U.S. PATENT DOCUMENTS

| | | | |
|---|---|---|---|
| 3,631,362 A | 12/1971 | Almasi et al. | |
| 4,225,826 A | 9/1980 | Lewis et al. | |
| 7,599,111 B2 | 10/2009 | Marquis | |
| 8,072,677 B2 * | 12/2011 | Falcoz et al. | 359/333 |
| 2005/0058173 A1 | 3/2005 | Vetrovec | |
| 2006/0153257 A1 * | 7/2006 | Franjic et al. | 372/34 |
| 2009/0073550 A1 | 3/2009 | Falcoz et al. | |
| 2009/0323754 A1 | 12/2009 | Branly | |

FOREIGN PATENT DOCUMENTS

| | | | |
|---|---|---|---|
| FR | 2877776 A1 | 5/2006 | |
| FR | 2879839 A1 | 6/2006 | |
| FR | 2901067 A1 | 11/2007 | |

OTHER PUBLICATIONS

John Vetrovec, "Diode-Pumped Active Mirror Amplifier for High-Average Power", Proceedings of the International conference on Lasers, Dec. 4, 2000, pp. 776-783, XP008006316.
Steve Guch, Jr., "Parasitic Suppression in Large Aperture Disk Lasers Employing Liquid Edge Claddings", Applied Optics, Jun. 1, 1976, pp. 1453-1457, vol. 15, No. 6, Optical Society of America, US, XP 002419100.
J.H.Kelly, et al., "High-Repetition-Rate Cr:Nd:CSGG Active-Mirror Amplifier", Optics Letters, Dec. 1, 1987, pp. 996-998, vol. 12, No. 12, Optical Society of America, US, XP002069938.

* cited by examiner

*Primary Examiner* — Kinam Park
(74) *Attorney, Agent, or Firm* — Baker Hostetler LLP

(57) ABSTRACT

A device for emitting a laser beam comprises a cylindrical solid amplifier medium, having a fluorescence wavelength $\lambda$, delimited by a surface $\Sigma$ connecting two faces and intended to be pumped through both the faces, or one of them, in order to become a gain medium. It comprises a cooling fluid of thermal conductivity $C_r$ in contact with the amplifier medium over one of the faces, and an index matching liquid that absorbs or scatters the fluorescence wavelength, of thermal conductivity $C_i < 0.3\ C_r$, in contact with the amplifier medium over its surface $\Sigma$.

7 Claims, 2 Drawing Sheets

ANTI-TRANSVERSE LASING DEVICE WITH LONGITUDINAL COOLING FOR EMITTING A LASER BEAM

CROSS-REFERENCE TO RELATED APPLICATION

This application claims priority to foreign French patent application No. FR 1004945, filed on Dec. 17, 2010, the disclosure of which is incorporated by reference in its entirety.

FIELD OF THE INVENTION

The field of the invention is that of solid-state lasers, particularly that of pulsed lasers having short pulses (nanoseconds to femtoseconds) with a high energy per pulse (more than 10 J) and a high average power (more than 10 W).

BACKGROUND

The mode of operation of a device for emitting a laser beam will be recalled in brief. It principally comprises an amplifier medium and pumping sources, which inject energy into the amplifier medium. This amplifier medium, which is in the form of a rod, may be a crystal or alternatively a doped glass. The laser beam to be amplified subsequently passes through the amplifier rod one or more times by means of optical devices, for example comprising mirrors; during each pass, it extracts a part of the energy injected during the pumping and is thus amplified in the amplifier rod. For an amplifier rod of cylindrical shape, the energy deposited during the pumping is generally confined in that part of the amplifier which is delimited by the diameter of the pump beam.

In this type of configuration of a laser beam amplification device, a parasitic phenomenon referred to as transverse lasing occurs between the time at which the energy is deposited in the amplifier rod by optical pumping and the time at which it is extracted by the beam to be amplified.

This phenomenon is associated with the creation of a laser sub-cavity in the amplifier rod along an axis transverse to the longitudinal axis of the amplifier rod, the changes in the refractive index at the amplifier rod-environment interface fulfilling the function of mirrors for this sub-cavity. The transverse lasing takes place when the oscillation condition of this sub-cavity is satisfied, that is to say when there is conservation of energy over the return path inside the sub-cavity, or in other words when the transverse gain G compensates for the losses P of the sub-cavity.

In what follows, a crystal will be taken as an example of an amplifier rod; it may of course be replaced by doped glass.

FIG. 1c represents the transverse optical gain G in a cylindrical amplifier crystal 1 (FIG. 1a) of length e, pumped through both its faces S1, S2 by a pumping laser beam 4 of diameter L. If the linear gain density is denoted by $g_0$, the small-signal gain $g_{ps}$ is equal to $g_0 \times e$ in the longitudinal direction Ox and to $g_0 \times L$ in a transverse direction perpendicular to Ox. Usually, L≧e.

Since the optical gain G is proportional to $e^{g_{ps}}$, it follows that:

$$e^{g_0 \cdot L} >> e^{g_0 \cdot e}$$

The optical gain G in the transverse direction is therefore much greater than the optical gain G in the longitudinal direction, that is to say in the direction of the laser beam to be amplified.

The transverse lasing is manifested by rapid removal of the energy stored in the crystal, caused by uncontrolled transverse stimulated emissions, at the cost of the laser beam which is intended to be amplified.

This transverse lasing is particularly problematic in the case of solid amplifier media with high gains and large dimensions (typically a gain $g_0$ of 0.88 and a pump diameter of 70 mm). For example, it prevents the generation of femtosecond laser pulses with a very high power, typically of the order of one petawatt, using a Ti:sapphire crystal pumped with high energies of the order of 100 J.

Until now, there have been two main types of solutions for suppressing this transverse lasing: those which consist in reducing the gain for the parasitic beam and those which consist in increasing the losses for the parasitic beam.

The first are little used and not well appreciated, because the problem is that reducing the gain for the parasitic beam also involves reducing the gain for the main beam. One elegant solution has been proposed by the Applicant, which consists in dividing up the available pumping energy and sending it to the pumped material at different times. This solution has formed the subject of French Patent Application No. 0413734 "Dispositif èlectronique de suppression du lasage transverse dans les amplificateurs laser haute ènergie" [Electronic device for the suppression of transverse lasing in high-energy laser amplifiers].

Most of the solutions, however, are based on increasing the level of losses for the parasitic oscillations.

A first possibility is to replace the air around the surface Σ connecting the faces S1 and S2 of the crystal 1 with water, the advantage of which is that it reduces the reflection coefficient at the interface (the refractive index changes from 1 to 1.33, while the material generally has a refractive index of between 1.5 and 1.8) and improves the cooling of the crystal in a region where a large amount of heat is deposited. This solution has formed the subject of French Patent Application No. 04411815. However, this solution is not entirely satisfactory because the reflection coefficient at the interface is still too high, and the 800 nm radiation can furthermore be reflected by the mechanical mounting and sent back to the material.

The solutions currently used in fact consist in replacing water with a liquid whose refraction index is identical or extremely close to that of the material (the term index matching is then used) and in adding a material which absorbs the 800 nm radiation to this refraction index matching liquid 21: this absorber material is also in the liquid state (it is generally a dye) and is mixed with the index matching liquid. Thus, the photons amplified at 800 nm perpendicularly to the axis are not reflected at the interface with the material by virtue of the refraction index matching liquid (and therefore they cannot pass through the gain zone a second time and be amplified even further), and then they are absorbed by the dye. This technique, described in Patent Application FR 2 901 067, works well at eliminating the transverse oscillations for laser systems based on titanium-doped sapphire because, owing to the low repetition rate of the pumping lasers (at most 0.1 Hz), the thermal load in the titanium-doped sapphire crystals has been limited (at most 100 J of pumping at 0.1 Hz producing a thermal load of from 6 to 7 W, taking the amplification efficiency into account) and architectures with an refraction index matching liquid+dye mixture not circulating around the titanium-sapphire crystal have been perfectly able to meet requirements.

However, the technology of pumping lasers has been developed substantially over the last few years, and it has now become possible to provide one hundred joules with a repetition rate of between 1 and 5 Hz; very close to 10 Hz may be achievable in the future, which will give an average pumping power of the order of one kilowatt and thermal deposition of the order of 600 to 700 watts in the crystal.

At this level, it is no longer effective to employ radial removal of the heat (represented by the arrow 10) using the refraction index matching liquid+dye mixture, the heat capacity of which is much less than that of water. The thermal properties of the mixture used (refraction index matching liquid for providing the index matching and dye absorbing the parasitic laser emission) do not permit satisfactory removal of heat. This is because the index matching liquid is a poor thermal conductor, which induces, when increasing the repetition rate of the lasers, a parabolic temperature profile illustrated in FIG. 1b, degrading the Strehl ratio (which is a beam quality coefficient) and inducing a short thermal focal length and wavefront aberrations.

One solution consists in replacing the index matching liquid with a cold finger in metallic contact with the surface $\Sigma$ of the crystal. This makes it possible to reduce the thermal effects, but not satisfactorily when the average power exceeds 400 W. Furthermore, such a cryogenic device is heavy, expensive and subject to vibrations, and does not make it possible to suppress the transverse lasing.

There are currently also devices for emitting a laser beam which comprise an amplifier medium in the form of a solid plate with pumping and thermal extraction in the longitudinal axis, and which comprise a different solid material on the side (the surface $\Sigma$), which fulfils the functions of index matching and an absorber; the material is either "welded" to the amplifier medium or placed in contact by molecular adhesion. These borders or rings are not always technologically achievable, however, depending on the materials.

Consequently, there still remains a need for a device for emitting a laser beam which simultaneously satisfies all the aforementioned requirements, particularly in terms of suppressing the transverse lasing, cooling and simplicity of use.

SUMMARY OF THE INVENTION

The invention is based on longitudinal cooling which is compatible with the use of an index matching liquid for suppressing the transverse lasing.

More precisely, the invention relates to a device for emitting a laser beam, which comprises a cylindrical solid amplifier medium, having a fluorescence wavelength $\lambda$, delimited by a surface $\Sigma$ connecting two faces S1 and S2 and intended to be pumped through both the faces, or one of them, in order to become a gain medium. It is principally characterized in that it comprises a cooling fluid of thermal conductivity Cr in contact with the amplifier medium over one of the faces, and an index matching liquid that absorbs or scatters the fluorescence wavelength, of thermal conductivity Ci<0.3 Cr, in contact with the amplifier medium over its surface $\Sigma$.

One of the advantages of this device is that the thermal gradient (with the assumption of approximately uniform deposition of heat in the material) is large along the propagation axis Ox and small perpendicularly to the axis, in contrast to the case of radial cooling. The thermal lens effects are therefore greatly reduced, and the quality of the wavefront is thus improved and almost independent of the pumping power level.

Furthermore, the use of a liquid to suppress the transverse lasing offers an expedient and universal solution in so far as it is very easy to match the liquid 21 to the selected amplifier medium 1 (for example by changing the dye), in contrast to the solution of the prior art with a solid ring welded to the amplifier medium.

Preferably, the face of the amplifier medium in contact with the cooling fluid is provided with a treatment reflective at the wavelength $\lambda$, which is intended to reflect the laser beam towards the amplifier medium.

When the amplifier medium is intended to be pumped through both the faces, the treatment reflective at the wavelength $\lambda$ is transparent at the pumping wavelength.

It optionally also comprises a cooling fluid of thermal conductivity Cr in contact with the other face.

The cooling fluid is for example water or helium, and the amplifier medium a Ti:Sa crystal.

According to a particular embodiment, it comprises an element for correcting the phase of the output beam, downstream of the cooling fluid.

This device for emitting a laser beam may be used as laser oscillator or a laser amplifier.

BRIEF DESCRIPTION OF THE DRAWINGS

Other features and advantages of the invention will become apparent on reading the following detailed description, which is given by way of nonlimiting example and with reference to the appended drawings.

From one figure to the other, elements which are the same are denoted by the same references.

DETAILED DESCRIPTION

In what follows, a crystal rod with circular faces S1, S2 of diameter D will be taken as an example of an amplifier medium 1. The crystals envisaged can be both single crystals or polycrystalline ceramics.

Figure 1A:
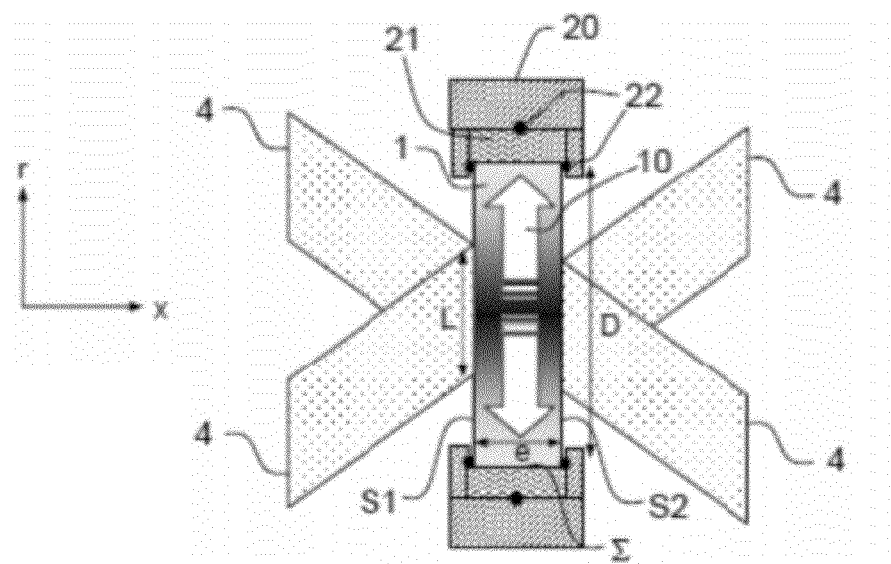
FIG. 1, already described, schematically represent an example of a device for amplifying a laser beam, equipped with a device for suppressing the transverse lasing and having radial cooling (FIG. 1a), the associated temperature profile as a function of the radius r of the rod (FIG. 1b), and the transverse gain (FIG. 1c), according to the prior art, FIG. 2 schematically represent an example of a device for amplifying a laser beam, equipped with a device for suppressing the transverse lasing and having longitudinal cooling (FIG. 2a), and the associated temperature profile as a function of the radius r of the rod (FIG. 2b), according to the invention.
Figure 1B:
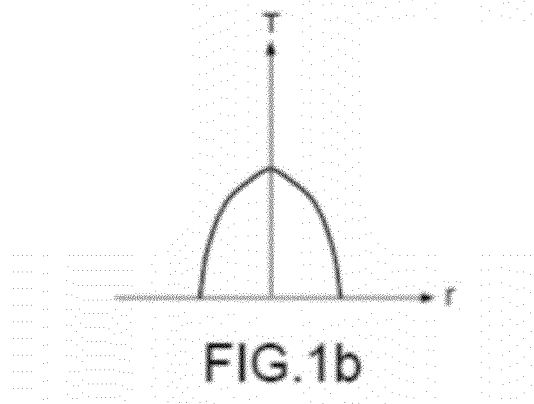
Figure 1C:
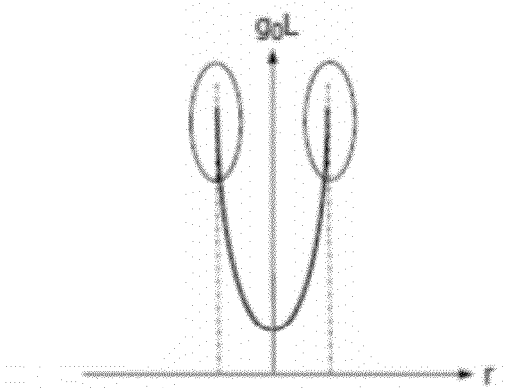
Figure 2A:
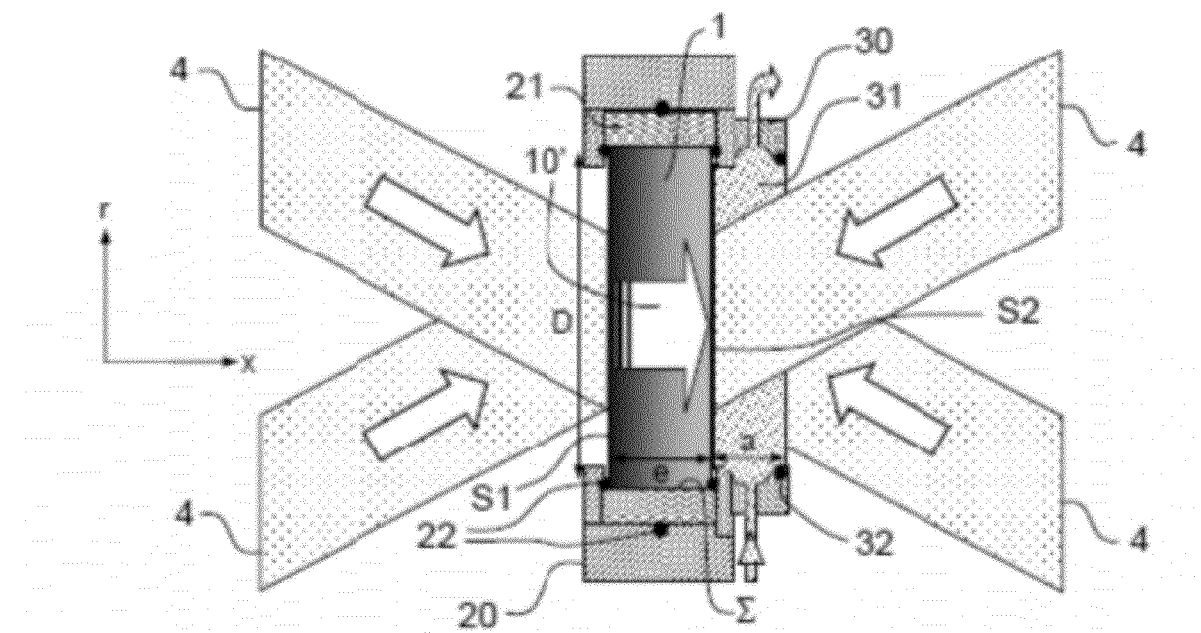

A device for amplifying a laser beam according to the invention, described with reference to FIG. 2, is principally provided with:
- a device 20 which is intended to counter the parasitic transverse oscillations and is placed so that an index matching liquid 21, which absorbs or scatters at the fluorescence wavelength, is in contact with the surface $\Sigma$ of the crystal 1,
- a device 30 for circulating a cooling fluid 31, which is positioned so that the cooling fluid 31 is in contact with a surface S1 or S2 of the crystal 1 (the surface S2 in the figure).

The cooling device 30 is preferably configured so that it can let the pumping radiation 4 pass through; the amplifier medium can therefore be pumped through both the faces S1 and S2.

Over the entire length e of the crystal, the refraction index matching liquid 21+dye mixture is in contact with the surface $\Sigma$ of the crystal 1 and therefore makes it possible to fulfill the function of suppressing the transverse oscillations. It is kept in contact with the crystal by means of a mechanical part equipped with seals 22, which is known to the person skilled in the art.

Independent circulation of a fluid 31 is added, which will be in contact with a face S2 of the crystal 1 (preferably the entire surface S2) and will remove the heat generated in the crystal 1 by the pumping radiation 4. This cooling fluid 31 is kept in contact with the crystal 1 by means of a mechanical part 30, which is also equipped with seals 32 and makes it possible for this fluid to circulate along the surface S2. These parts 20 and 30 are arranged so that the index matching liquid 21 and the cooling fluid 31 are not in contact.

In order for the removal of heat (represented by the arrow 10') to be essentially longitudinal (along Ox), preventing the occurrence of any transverse gradient of temperature and therefore index (along r) and thus avoiding the formation of a thermal lens in the amplifier medium, an index matching liquid is used whose thermal conductivity Ci is less than that Cr of the cooling fluid, with Ci<0.3 Cr.

Figure 2B:
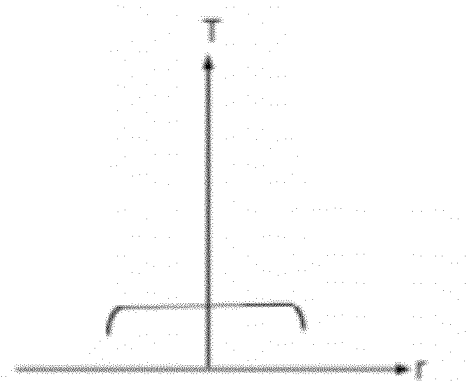

When using for example diiodomethane with a thermal conductivity Ci equal to 0.1 W/(m·K) as the index matching liquid 21, and water with a thermal conductivity Cr equal to 0.6 W/(m·K) as the cooling fluid 31, there is almost no formation of a thermal lens in the Ti:Sa crystal, as can be seen in FIG. 2b.

This decoupling of the anti-transverse lasing function and the cooling function thus makes it possible to remove large amounts of heat in view of the thermal constants of water. The removal of heat is commensurately more effective when the amplifier medium is not too thick: preferably, e<D/2, D being the diameter of the amplifier medium. Furthermore, the use of a liquid to suppress the transverse lasing offers a universal solution in so far as it is easy to match the liquid 21 to the selected amplifier medium 1, in contrast to the solution of the prior art with a solid ring welded to the amplifier medium.

Another very great advantage is that the thermal gradient (with the assumption of approximately uniform deposition of heat in the material) is large along the propagation axis Ox and small perpendicularly to the axis, in contrast to the case of radial cooling. The thermal lens effects are therefore greatly reduced, and the quality of the wavefront is thus improved and almost independent of the pumping power level.

In a basic configuration, the amplifier medium 1 is pumped through both the faces S1 and S2, which is important for making the deposition of heat uniform, while the laser beam is reflected by the surface S2 of the amplifier medium in contact with the cooling fluid 31. Specifically, it may be assumed at first analysis that the pumping beam 4 can pass through the layer of water without difficulties because it is not absorbed (water is transparent over a large part of the visible and near infrared spectra), and even if the wavefront is slightly perturbed when passing through the water, this is without consequence because the pumping process consists in energy transfer following absorption of the radiation and this radiation is absorbed rapidly enough for there to be no risks of degrading the pump beam, leading for example to overintensities which may damage the amplifier medium. On the other hand, in this basic configuration the beam to be amplified is reflected at the amplifier medium-water interface (surface S2) so that it does not have to pass through the layer of water, which may degrade the wavefront; to this end, the face S2 (referred to as the rear face) of the amplifier medium is treated with a high reflectivity (typically, R>98%) for the fluorescence wavelength of the amplifier medium but with good transparency (typically, T>95%) for the wavelength of the pumping beam 4.

When the amplifier medium 1 is pumped only through the face S1, the condition for transparency (of the reflective treatment) of the face S2 for the wavelength of the pumping beam 4 is no longer necessary.

The fact of having the face S2 of the material treated with a high reflectivity for the wavelength to be amplified risks promoting parasitic longitudinal oscillation (between the 2 faces S1 and S2 of the amplifier medium) because, even though the gain in the axis is lower, it is the face S1 (referred to as the front face) which on its own has to counter the gain by virtue of its antireflection treatment, while it is known that a dual-band antireflection treatment (one band for the laser, one band for the pumping) including a wide band, which has to be resistant to the laser flux, does not perform very well in terms of residual reflectivity.

This is why, according to a first alternative configuration, the beam to be amplified passes through the layer of water and can be corrected if necessary in terms of its wavefront by means of a phase correction component, for example a deformable mirror arranged outside the crystal, downstream of the layer of water, on the path of the emitted laser beam.

According to a second variant, a second cooling device is added on the other face of the amplifier medium, the face S1.

Whatever the configuration selected, the water may be replaced with another liquid such as ethylene, ethylene glycol or a water+ethylene glycol mixture, for example, or alternatively with a flow of gas (for example helium) optimized to ensure good heat exchange. A flow of gas is particularly suitable for the alternative configurations because it leads to less perturbations of the wavefront than passing through a layer of water, particularly if the flow is turbulent.

An exemplary embodiment will now be described, with water as the cooling fluid and a Ti:Sa crystal as the amplifier medium, with circular surfaces S1 and S2 having a diameter of 20 cm.

The following abbreviations are used:
F=flow rate of water in l/min
$\rho$=density of water=1000 kg/m$^3$
Cp=heat capacity of water=4180 J/(kg·° C.)
$\Delta T$=temperature rise of the cooling water in ° C.
V=flow speed of the water in m/s
S=cross section of the water film in m$^2$=a×D
P=thermal power to be extracted from the Ti:Sa in W
The following applies:

$$P(W)=F\times(1/60000)\times\rho\times Cp\times\Delta T$$

With F (l/min)=V×S×60000
For:
P to be removed=1 kW; a=5 mm; D=20 cm; $\Delta T$=1° C., it is therefore necessary to have a flow rate: F=14.35 l/min i.e. 0.24 m/s (or 0.8 km/h).

In other words, if the rear face (S2) of a Ti:Sa having a diameter of 20 cm is cooled with a film of water having a thickness of 5 mm with a flow rate equal to 14.4 l/min, then 1 kW of heat (i.e. the main amplifier stage of a 10 PW laser system at 2 Hz) can be extracted with a rise of only 1° C. in the water temperature.

This configuration has the following advantages:
the absence of a thermal lens makes it possible to modify the pumping energy without affecting the propagation conditions of the beam at 800 nm (=fluorescence wavelength of the Ti:Sa),
average pumping powers of more than one kW are possible,
the face S2 of the Ti:Sa crystal in contact with the water is treated to be reflective at 800 nm. The 800 nm beam therefore does not pass through the water film, which makes it possible to avoid degradation of the wavefront,
transverse gains exp(g0×L) of up to 20000 are achievable without transverse lasing, which makes it possible to reach peak powers of 10 PW (300 J ampli output over 17 cm diameter with 800 J pump).

Other examples which may be mentioned for an amplifier medium are: Nd:YAG, Nd:YLF, Yb:YAG, etc.

An example of the device for amplifying a laser beam emitted by an oscillator has been presented, although the device according to the invention may also be used in a laser oscillator generating a laser beam.

The invention claimed is:

1. A device for emitting a laser beam, comprising:
a cylindrical solid amplifier medium, having a fluorescence wavelength $\lambda$, delimited by a surface connecting two faces and intended to be pumped through both the faces, or one of them, in order to become a gain medium, further comprising a cooling fluid of thermal conductivity Cr in contact with the amplifier medium over one of the faces, and a refraction index matching liquid that absorbs or scatters the fluorescence wavelength, of thermal conductivity Ci<0.3 Cr, in contact with the amplifier medium over its surface.

2. The device for emitting a laser beam as claimed in claim 1, wherein the face of the amplifier medium in contact with the cooling fluid is provided with a treatment reflective at the wavelength $\lambda$, which is intended to reflect the laser beam toward the amplifier medium.

3. The device for emitting a laser beam as claimed in claim 2, wherein the treatment reflective at the wavelength $\lambda$ is transparent at the pumping wavelength.

4. The device for emitting a laser beam as claimed in claim 1, wherein it comprises a cooling fluid of thermal conductivity Cr in contact with the other face.

5. The device for emitting a laser beam as claimed in claim 1, wherein it comprises a phase correction element on an output path of the emitted beam, downstream of the cooling fluid.

6. The device for emitting a laser beam as claimed in claim 1, wherein the cooling fluid is water or helium, and wherein the amplifier medium is a Ti:Sa crystal.

7. The device for emitting a laser beam as claimed in claim 1, which is a laser oscillator or a laser amplifier.

* * * * *